(12) United States Patent
Takeda et al.

(10) Patent No.: US 8,960,681 B2
(45) Date of Patent: Feb. 24, 2015

(54) CYLINDER HEAD GASKET

(75) Inventors: Yasumaro Takeda, Toyota (JP); Toru Takasu, Toyota (JP); Ryosuke Fujiki, Toyota (JP); Kazuya Yoshijima, Okazaki (JP); Yoshihiko Masuda, Okazaki (JP)

(73) Assignees: Nippon Gasket Co., Ltd., Toyota-shi, Aichi (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 851 days.

(21) Appl. No.: 12/737,268

(22) PCT Filed: Jul. 6, 2009

(86) PCT No.: PCT/JP2009/062296
§ 371 (c)(1),
(2), (4) Date: Dec. 22, 2010

(87) PCT Pub. No.: WO2010/007911
PCT Pub. Date: Jan. 21, 2010

(65) Prior Publication Data
US 2011/0095492 A1 Apr. 28, 2011

(30) Foreign Application Priority Data
Jul. 17, 2008 (JP) .................................. 2008-186445

(51) Int. Cl.
*F02F 11/00* (2006.01)
*F16J 15/08* (2006.01)

(52) U.S. Cl.
CPC .......... *F16J 15/0831* (2013.01); *F16J 15/0825* (2013.01); *F16J 2015/085* (2013.01); *F16J 2015/0856* (2013.01); *F16J 2015/0862* (2013.01); *F16J 2015/0868* (2013.01)
USPC ........................................................ 277/598

(58) Field of Classification Search
USPC .......... 277/594, 595, 596, 591, 592, 593, 598
See application file for complete search history.

(56) References Cited

U.S. PATENT DOCUMENTS 5,121,932 A * 6/1992 Goldman et al. ............. 277/600
5,267,740 A * 12/1993 Stritzke ........................ 277/596

(Continued)

FOREIGN PATENT DOCUMENTS

JP 05-032873 4/1993
JP 08-291864 11/1996

(Continued)

OTHER PUBLICATIONS

European Patent Office Communication together with Supplementary European Search Report issued in European Application No. 09 79 7837 dated Sep. 30, 2011 (7 pages).

*Primary Examiner* — Vishal Patel
*Assistant Examiner* — L. Susmitha Koneru
(74) *Attorney, Agent, or Firm* — Flynn, Thiel, Boutell & Tanis, P.C.

(57) ABSTRACT

A cylinder head gasket 1 is sandwiched between a cylinder head 2 and a cylinder block 3 with a cylinder bore 4 and includes a substrate 10 with a combustion chamber hole 14 drilled at a position of the cylinder bore 4, and seal plates 11 to 13, the substrate 10 and the seal plates are stacked on one another. Fixation members 21 and 22 are secured to the substrate around a periphery of the combustion chamber hole. The seal plates include an engagement hole 23 formed therein and with which the fixation members are engaged. The engagement hole is engaged with the fixation members. The fixation members are sandwiched between the cylinder head and the cylinder block. The cylinder head and the cylinder block can be firmly coupled together via the fixation members.

22 Claims, 5 Drawing Sheets

(56) References Cited

U.S. PATENT DOCUMENTS

| | | | |
|---|---|---|---|
| 5,277,434 A * | 1/1994 | Kestly et al. | 277/592 |
| 5,482,298 A * | 1/1996 | Udagawa | 277/600 |
| 5,628,113 A | 5/1997 | Tanaka et al. | |
| 5,890,719 A * | 4/1999 | Bettencourt | 277/599 |
| 5,975,539 A * | 11/1999 | Ueda et al. | 277/593 |
| 6,027,124 A * | 2/2000 | Ishida et al. | 277/595 |
| 6,299,175 B1 * | 10/2001 | Maekawa et al. | 277/593 |
| 6,354,599 B1 * | 3/2002 | Inamura | 277/591 |
| 6,406,032 B1 * | 6/2002 | Miyaoh | 277/594 |
| 6,517,084 B2 * | 2/2003 | Inamura | 277/592 |
| 6,676,133 B2 * | 1/2004 | Obermaier et al. | 277/593 |
| 7,070,187 B2 * | 7/2006 | Boeve | 277/598 |
| 7,152,571 B1 * | 12/2006 | Wilson et al. | 123/196 R |
| 8,496,253 B2 * | 7/2013 | Goettler et al. | 277/594 |
| 2001/0045708 A1 | 11/2001 | Hohe et al. | |
| 2002/0180161 A1 * | 12/2002 | Werz et al. | 277/594 |
| 2003/0151210 A1 | 8/2003 | Ueta et al. | |
| 2005/0269788 A1 * | 12/2005 | Grunfeld | 277/592 |
| 2006/0138731 A1 * | 6/2006 | Stetter et al. | 277/594 |
| 2008/0023922 A1 | 1/2008 | Umehara | |
| 2012/0175847 A1 * | 7/2012 | Popielas et al. | 277/592 |

FOREIGN PATENT DOCUMENTS

| | | |
|---|---|---|
| JP | 2002-054741 | 2/2002 |
| JP | 2005-127404 | 5/2005 |
| WO | WO 2006/061042 A1 | 6/2006 |

* cited by examiner

CYLINDER HEAD GASKET

TECHNICAL FIELD

The present invention relates to a cylinder head gasket, and more specifically, to a cylinder head gasket sandwiched between a cylinder head and a cylinder block with a cylinder bore and including a substrate with a combustion chamber hole drilled at the position of the cylinder bore and a seal plate stacked on the substrate.

BACKGROUND ART

A cylinder head gasket is conventionally known which is sandwiched between a cylinder head and a cylinder block with a cylinder bore and which includes a substrate with a combustion chamber hole drilled at the position of the cylinder bore and a plurality of seal plates; the substrate and the seal plates are stacked on one another (for example, Patent Literature 1).

PRIOR ART DOCUMENTS

Patent Literature

Patent Literature 1: Japanese Patent Laid-Open No. 2005-127404

SUMMARY OF INVENTION

Problems to be Solved by the Invention

A cylinder block in an engine is slightly elastically deformed by explosion pressure in a combustion chamber during operation of the engine. In particular, in a open deck cylinder block including a plurality of cylinder bores arranged in series and a water jacket formed around the cylinder bores and which is open in the top surface of the cylinder block, the cylinder bore side is elastically deformed more significantly than the water jacket compared to cylinder blocks that are not of the open deck type.

This elastic deformation is relatively significant between the adjacent bores in the cylinder block, and in the worst case, may result in cracks.

When the conventionally well-known cylinder head gasket is applied to an engine with the periphery of the cylinder bores relatively significantly deformed, the elastic deformation may disadvantageously cause rubbing between the cylinder head gasket and the cylinder block, between the cylinder head gasket and the cylinder head, or between the overlappingly stacked substrate and seal plate. This may degrade the sealability of the corresponding portion.

In view of such circumstances, the present invention provides a cylinder head gasket configured to minimize the elastic deformation of the cylinder block to maintain proper sealability for a long period.

Means for Solving the Problems

That is, the invention provides a cylinder head gasket sandwiched between a cylinder head and a cylinder block with a cylinder bore and including a substrate with a combustion chamber hole drilled at a position of the cylinder bore, and a seal plate stacked on the substrate, characterized in that:

a fixation member is secured to the substrate around a periphery of the combustion chamber hole, in that the seal plate comprises an engagement hole formed therein and with which the fixation member is engaged and the engagement hole is engaged with the fixation member, and in that the fixation member is sandwiched between the cylinder head and the cylinder block.

Advantageous Effects of Invention

The above-described configuration allows the fixation member provided around the periphery of the combustion chamber hole to be sandwiched between the cylinder head and the cylinder block. Thus, the above-described configuration allows the cylinder head and the cylinder block to be coupled together via the fixation member more firmly than the conventional configuration, which does not include this fixation member.

The configuration allows deformation of the cylinder block caused by explosion pressure in an engine to be suppressed. This enables prevention of possible cracks in the cylinder block resulting from the deformation. The configuration further allows inhibition of possible rubbing between the cylinder head gasket and the cylinder block, between the cylinder head gasket and the cylinder head, or between the substrate and the seal plate. This enables sealability to be prevented from being degraded by the rubbing.

MODE FOR CARRYING OUT THE INVENTION

Figure 2:
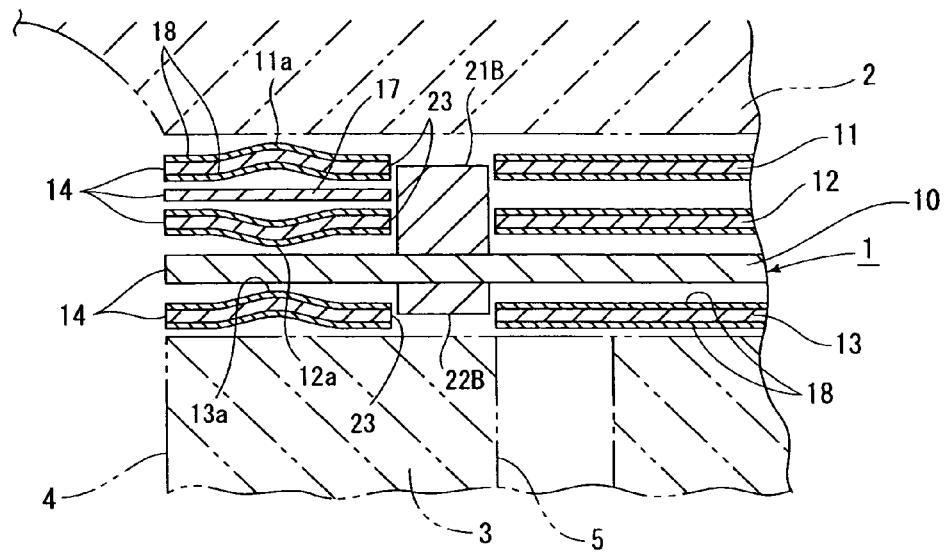
FIG. 2 is an enlarged sectional view taken along line II-II in FIG. 1.

The present invention will be described in conjunction with an embodiment shown in the figures. In FIG. 2, a cylinder head gasket according to the embodiment 1 is sandwiched between a cylinder head 2 and a cylinder block 3 to seal between the cylinder head 2 and the cylinder block 3.

Figure 1:
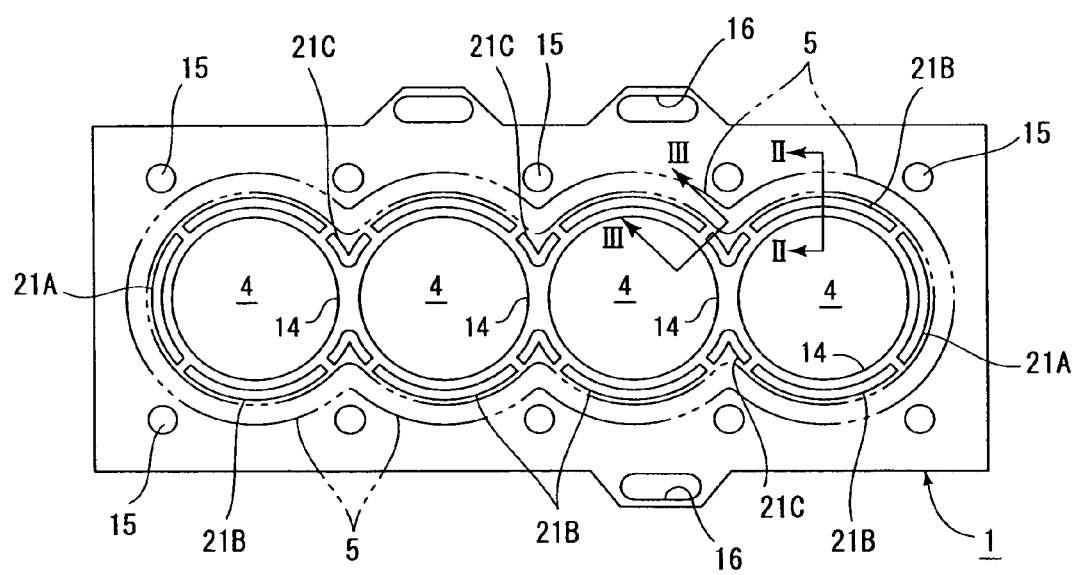
FIG. 1 is a plan view showing a first embodiment of the present invention.

In the embodiment shown in FIG. 1, the cylinder block 3 includes four cylinder bores 4 arranged in series on a straight line. A water jacket 5 is formed to surround the cylinder bores 4. The water jacket 5 is open in the top surface of the cylinder block 3.

As shown in FIG. 2, the cylinder head gasket 1 includes one metal substrate 10, two metal seal plates arranged on the cylinder head 2 side of the substrate 10, that is, a first seal plate 11 and a second seal plate 12, and one metal seal plate located on the cylinder block 3 side of the substrate 10, that is, a third seal plate 13. Four combustion chamber holes 14 are formed by drilling in each of the substrate 10 and the seal plates 11 to 13 so as to align with the respective cylinder bores 4 in the cylinder block 3.

Furthermore, as shown in FIG. 1, a plurality of bolt holes 15 and a plurality of blow-by holes 16 are drilled in each of the substrate 10 and the seal plates 11 to 13; fastening bolts (not shown in the drawings) are inserted through the respective bolt holes 15, and blow-by gas is allowed to flow through the blow-by holes 16.

Moreover, as shown in FIG. 2, metal shim plates 17 formed like rings so as to surround the respective combustion chamber holes 14 are provided between the first seal plate 11 and the second seal plate 12. The shim plates 17 are arranged for the respective cylinder bores 4.

The ring-like shim plates 17 arranged for the respective cylinder bores 4 are integrally coupled together at positions each midway between the cylinder bores 4. This further facilitates assembly. However, the shim plates 17 may be separately manufactured.

Full beads 11a and 12a are formed on the upper first seal plate 11 and lower second seal plate 12, respectively, arranged on the cylinder head 2 side of the substrate 10, to the extent that the first and second seal plates 11 and 12 overlap the ring-like shim plate 17. The full bead 11a formed on the upper first seal plate 11 on which the cylinder head 2 abuts is formed so as to project toward the cylinder head 2.

On the other hand, the full bead 12a formed on the lower second seal plate 12 on which the substrate 10 abuts is formed so as to project toward the substrate 10.

A full bead 13a projecting toward the substrate 10 is also formed on a third seal plate 13 located on the cylinder block 3 side of the substrate 10. Each of the full beads 11a to 13a is formed so as to endlessly surround the corresponding one of the combustion chamber holes 14.

The surface of each of the first seal plate 11 to the third seal plate 13 is coated with a coating material 18 such as a fluorine- or nitrile-containing material rubber or elastomer.

The coating material 18 is provided in order to allow each seal plate to more tightly contact a corresponding member and to improve the sealability of the seal plate. Moreover, to provide the seal plate with slidability or non-viscosity, a top coat such as graphite or wax may be applied to the surface of the coating material 18.

As shown in FIG. 1 and FIG. 2, a plurality of metal fixation members 21 (A to C) and 22 (A to C) are secured, by spot welding, to the respective opposite surfaces of the substrate 10 at required positions surrounding each of the combustion chamber holes 14. On the other hand, engagement holes 23 are drilled in each of the first seal plate 11 to the third seal plate 13 so that the fixation members 21 and 22 can be engaged with the respective engagement holes 23. Furthermore, the shim plate 17 is located closer to the combustion chamber hole 14 than the fixation member 21.

A stainless material is desirably used for the fixation members 21 and 22 in order to prevent metal contact portions from being corroded. However, the present invention is not limited to the stainless material, and any appropriate material may be used as required. Furthermore, the engagement holes 23 may be formed by pressing similarly to the bolt holes 15 and the blow-by hole 16.

As means for securing the fixation members 21 and 22 to the substrate 10, adhesion with a heat-resistant adhesive containing a polyimide or an inorganic compound may be adopted besides spot welding.

The fixation members 21 and 22 are located inside the above-described water jacket 5 formed to surround each of the cylinder bores 4. Thus, when the cylinder head gasket 1 is sandwiched between the cylinder head 2 and the cylinder block 3, the fixation members 21 fixed to the top surface of the substrate 10 come into contact with the cylinder head 2. Furthermore, the fixation members 22 fixed to the bottom surface of the substrate 10 come into contact with the cylinder block 3.

Thus, when the cylinder head gasket 1 is sandwiched between the cylinder head 2 and the cylinder block 3, the cylinder head 2 contacting the upper fixation members 21 is firmly coupled, via the metal fixation members 21 and 22 and the metal substrate 10, to the cylinder block 3 located inside the water jacket 5 contacting the lower fixation members 22.

Hence, in particular, the cylinder block 3 located inside the water jacket 5 can be hindered from being bent outward in the radial direction of the cylinder bores 4 by explosion pressure exerted on the cylinder bore 4 side.

Furthermore, the first seal plate 11 to the third seal plate 13 are coupled to the fixation members 21 and 22 via the engagement holes 23, and the shim plate 17 is also coupled to the fixation member 21 via the outer end surface thereof. Thus, the possible relative displacement among the substrate 10 and the seal plates 11 to 13 and 17 is inhibited.

The plurality of fixation members 21 and 22 are each arranged so as to surround the corresponding one of the combustion chamber holes 14. In the embodiment shown in FIG. 1, the fixation members 21A and 22A are located outside the four cylinder bores 4 arranged in series on the straight line so as to lie on the opposite sides of the four cylinder bores in the in-series arrangement direction. Each of the fixation members 21A and 22A is further shaped like a circular arc so as to surround the combustion chamber holes 14.

The fixation members 21B and 22B are located at the opposite positions of each of the cylinder bores 4 in a direction orthogonal to the direction in which the cylinder bores 4 are arranged on the straight line. Each of the fixation members 21B and 22B is also shaped like a circular arc so as to surround the corresponding one of the combustion chamber holes 14.

On the other hand, the fixation members 21C and 22C are each located between the adjacent cylinder bores 4, 4 so as to lie adjacent to both cylinder bores 4, 4, and V-shaped along the adjacent cylinder bores 4, 4.

When the engine is driven, the cylinder block 3 configured as described above is generally deformed relatively significantly between the adjacent cylinder bores 4, 4 and relatively insignificantly at the other positions.

Figure 3:
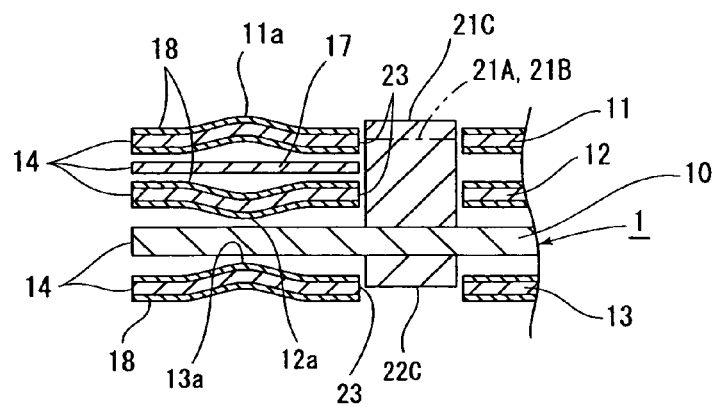
FIG. 3 is an enlarged sectional view taken along line III-III in FIG. 1.

Thus, the fixation member 21C, one of the fixation members 21C and 22C each arranged between the cylinder bores 4 and 4 so as to lie adjacent to both cylinder bores 4, 4, is set to be thicker than the other fixation members 21A and 21B (see FIGS. 3 and 2).

Hence, the cylinder head 2 and the cylinder block 3 are locally firmly coupled to each other at the portion of the thick fixation member 21C under a surface pressure higher than at the other portions. This enables the local deformation of the cylinder block 3 to be more effectively suppressed with the total fastening force between the cylinder head 2 and the cylinder block 3 kept weak.

Then, provided that the local deformation of the cylinder block 3 can be effectively suppressed, the following can be inhibited: the resultant rubbing between the cylinder block 3 and the third seal plate 13, the rubbing between the cylinder head 2 and the first seal plate 11, or the rubbing between the first seal plate 11 and the second seal plate 12, between the second seal plate 12 and the substrate 10, between the substrate 10 and the third seal plate 13. As a result, possible degradation of sealability caused by the rubbing can be prevented.

In the above-described embodiment, the fixation member 21C, one of the fixation members 21C and 22C, is set to be thicker than the other fixation members 21A and 21B. However, in contrast, the fixation member 22C, the other of the fixation members 21C and 22C, may be set to be thicker than the other fixation members 22A and 22B. Alternatively, both fixation members 21C and 22C may be set to be thicker than the other fixation members 21A, 21B, 22A, and 22B.

Figure 4:
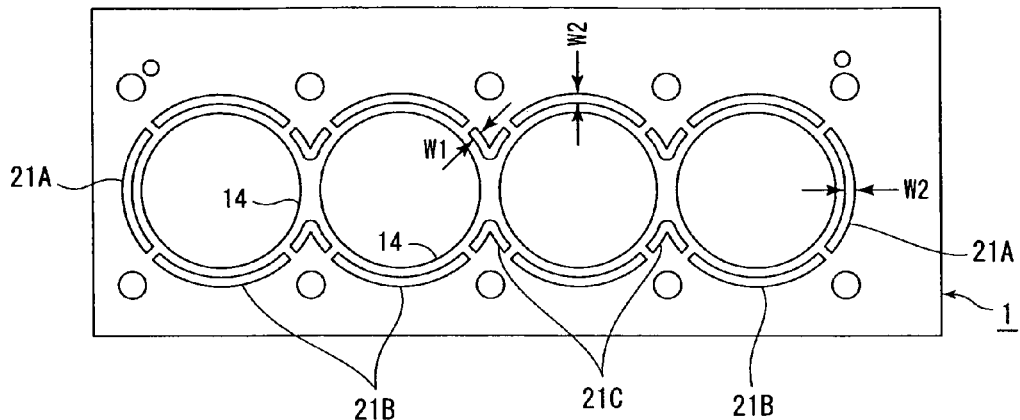
FIG. 4 is a plan view showing a second embodiment of the present invention.

FIG. 4 shows a second embodiment of the present invention. In the above-described embodiment, the thickness of the fixation member 21 is varied so as to be suitable for each arrangement position, whereas in the present embodiment, the width of the fixation member 21 is varied.

That is, in the present embodiment, the width W1 of the fixation members 21C and 22C each located between the adjacent cylinder bores 4, 4 so as to lie adjacent to both cylinder bores 4, 4 is set to be smaller than the width W2 of the other fixation members 21A, 22A, 21B, and 22B instead of making the thickness thicker.

Thus, in the present embodiment, the surface pressure of the cylinder head 2 and the cylinder block 3 is locally higher in the portion of the narrow fixation members 21C and 22C than in the other portions. This enables the local deformation of the cylinder block 3 to be more effectively suppressed with the total fastening force between the cylinder head 2 and the cylinder block 3 kept weak.

Figure 5:
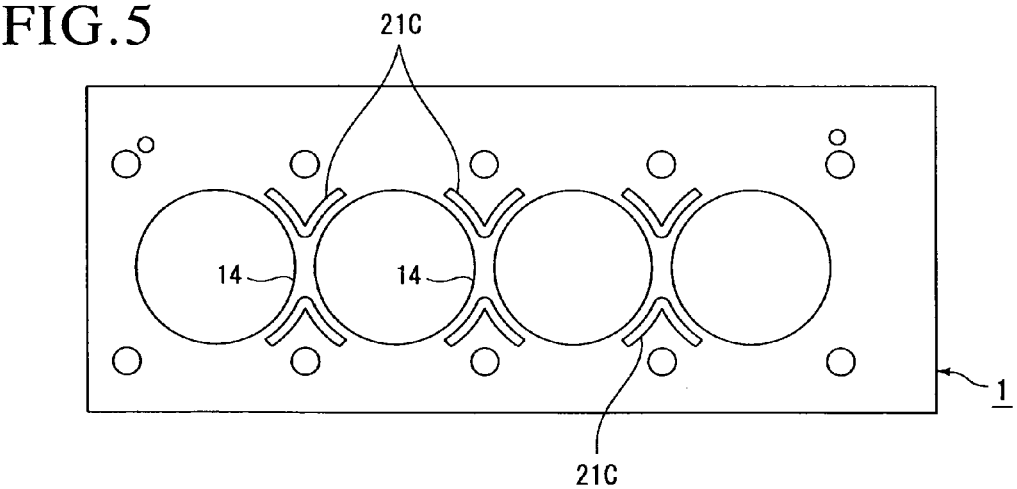
FIG. 5 is a plan view showing a third embodiment of the present invention.

FIG. 5 shows a third embodiment of the present invention. In the above-described embodiments, the thickness or width of the fixation member 21 is varied so as to be suitable for each arrangement position. However, in the present embodiment, the fixation members 21A, 22A, 21B, and 22B provided at the thin or wide position in the above-described embodiments are omitted.

That is, in the present embodiment, the fixation members 21C and 22C are arranged between the adjacent cylinder bores 4, 4 so as to lie adjacent to both cylinder bores 4, 4. However, the fixation members 21A, 22A, 21B, and 22B provided in the above-described embodiments are omitted; the fixation members 21A and 22A are located outside the four cylinder bores 4 arranged in series, in the in-series arrangement direction, and the fixation members 21B and 22B are arranged in the direction orthogonal to the in-series arrangement direction.

Also in such a configuration, the deformation of the portion between the cylinder bores 4, 4, which is particularly likely to be deformed, can be suppressed. Thus, the local deformation of the cylinder block 3 can be suppressed.

Operations and advantages similar to those described above may be obtained by varying the hardness of the fixation member 21, though this is not shown in the drawings. That is, a high hardness may be set for the fixation members 21C and 22C arranged between the adjacent cylinder bores 4, 4 so as to lie adjacent to both cylinder bores 4, 4. On the other hand, a relatively low hardness may be set for the fixation members 21A and 22A located outside the four cylinder bores 4 arranged in series, in the in-series arrangement direction of the cylinder bores 4, and the fixation members 21B and 22B located in the direction orthogonal to the in-series arrangement direction.

Such hardness settings also enable an increase in the surface pressure of the portion that is particularly likely to be deformed. Thus, the local deformation of the cylinder block 3 can also be suppressed.

Furthermore, in each of the above-described embodiments, the deformation of the portion between the adjacent cylinder bores 4, 4 is suppressed by setting the surface pressure of the portion between the adjacent cylinder bores 4, 4 to be higher than that on the other portions. However, the present invention is not limited to this aspect. For example, the highest surface pressure may be set for the fixation members 21C and 22C each located between the adjacent cylinder bores 4, 4 so as to lie adjacent to both cylinder bores 4, 4. A medium surface pressure may be set for one of the set of the fixation members 21A and 22A located outside the four cylinder bores 4 arranged in series, in the in-series arrangement direction of the cylinder bores 4 and the set of the fixation members 21B and 22B located in the direction orthogonal to the in-series arrangement direction. A low surface pressure may be set for the other set of the fixation members.

In short, the surface pressure obtained by each fixation member 21 may be set to be optimum depending on the magnitude of deformation in the engine.

Figure 6:
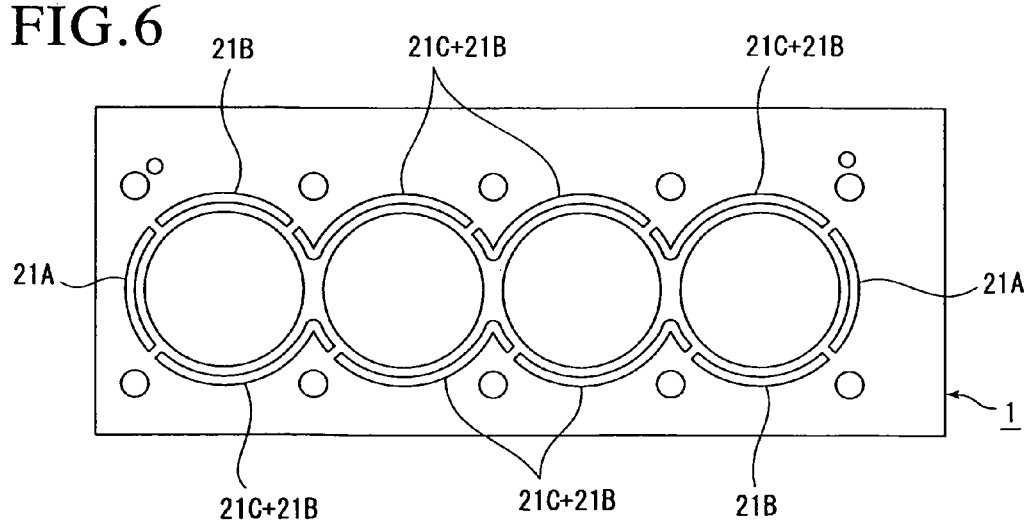
FIG. 6 is a plan view showing a fourth embodiment of the present invention.

On the other hand, unlike in the case of the above-described embodiment, for some engines, the same height, width, or hardness may be set for all the fixation members 21. That is, FIG. 6 shows a fourth embodiment of the present invention. In the present embodiment, the fixation members 21 have the same thickness, width, and hardness.

In the present embodiment, the fixation members 21C and 22C each located between the cylinder bores 4, 4 so as to lie adjacent to both cylinder bores 4, 4 are formed so as to be integrally continuous with the fixation members 21B and 22B, respectively, located adjacent to the fixation members 21C and 22c in the clockwise direction around each of the cylinder bores 4. In FIG. 6, the fixation members thus formed to be integrally continuous are denoted by the reference numeral (21C+21B).

The following, other fixation members are independently provided: the fixation members 21A and 22A located outside the four cylinder bores 4 arranged in series, in the in-series arrangement direction of the cylinder bores 4, and the remaining fixation members 21B and 22B that are not formed to be integrally continuous with the fixation members 21C and 22C.

In the embodiment in FIG. 1, even when the fixation members 21 and 22 are set to have the same thickness, width, and hardness, a total of 32 fixation members 21 and 22 need to be prepared. However, in the embodiment in FIG. 6, the number of fixation members 21 and 22 that need to be prepared may be reduced to 20. This allows the operability of assembly of the fixation members to be improved.

Also in the present embodiment, the cylinder head 2 and the cylinder block 3 can be firmly coupled together around each of the cylinder bores 4 by the fixation members 21. Thus, the local deformation of the cylinder block 3 can be effectively suppressed.

Figure 7:
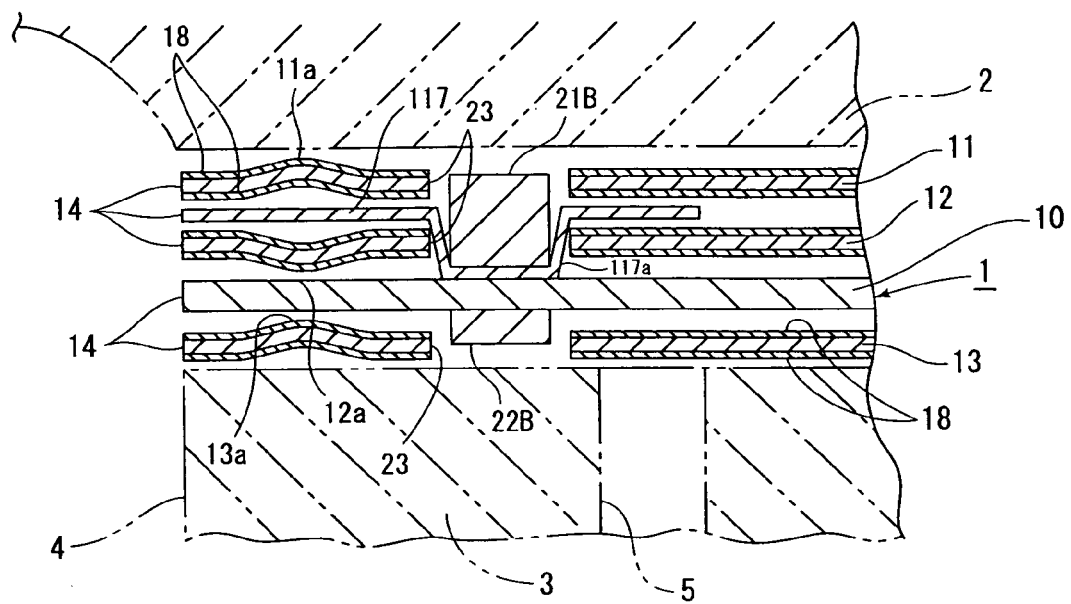
FIG. 7 is a sectional view showing a fifth embodiment of the present invention as well as a portion similar to that shown in FIG. 2.
Figure 8:
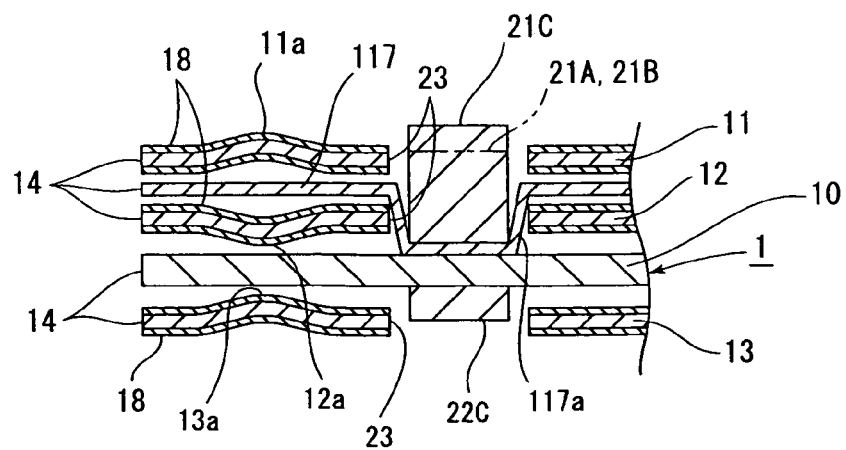
FIG. 8 is a sectional view showing the fifth embodiment of the present invention as well as a portion similar to that shown in FIG. 3.

Moreover, FIGS. 7 and 8 show a fifth embodiment of the present invention. A shim plate 117 in the present embodiment is wider than the shim plate 17 in the above-described first embodiment.

That is, the shim plate 117 in the present invention extends from the combustion chamber hole 14 to beyond the fixation member 21. The shim plate 117 is further secured to the fixation member 21 and the substrate 10, for example, by spot welding so as to be integrated with the fixation member 21 and the substrate 10.

In this case, the second seal plate 12 is interposed between the shim plate 117 and the substrate 10. Thus, a part of the shim plate 117 projects through the engagement hole 23 formed in the second seal plate 12 and is secured to the substrate 10. Furthermore, the fixation member 21 is positioned inside a projection portion 117a.

The shim plate 117 can be secured to the substrate 10, for example, as follows.

That is, the second seal plate 12 and the planarly formed shim plate 117 are stacked on the top surface of the substrate 10. In this state, the fixation members 21 are placed at required positions on the shim plate 117. The fixation members 22 are located at required positions on the bottom surface of the substrate 10.

Then, in this state, the fixation members 21 and 22 are pressed hard against each other with the substrate 10 sandwiched between the fixation members 21 and 22. Thus, while being partly deformed, the shim plate 117 is made to project through the engagement hole 23 formed in the second seal plate 12 and to tightly contact the substrate 10. In this state, the fixation member 21 is positioned inside the projection portion 117a.

Then, in this state, both fixation members 21 and 22 are spot-welded to the substrate 10 and thus integrally secured to the substrate 10 together with the shim plate 117. Thereafter, the first seal plate 11 and the third seal plate 13 are stacked on the substrate 10.

In the above-described fifth embodiment, the fixation member 21 is made to tightly contact the substrate 10 to partly deform the shim plate 117 to form the projection portion 117a. However, the present invention is not limited to this. The projection portion 117a may be preformed at the required position on the shim plate 117 and secured to the substrate 10 together with the fixation member 21. In this case, the shim plate 117 can be easily secured with an adhesive.

The fifth embodiment has been described based on the first embodiment. However, apparently, the fifth embodiment may be based on any of the second embodiment to the fourth embodiment.

Moreover, in any of the above-described embodiments, for example, a recessed and protruding surface with a pointed tip may be formed on a surface of each fixation member 21 contacting the cylinder head 2 and on a surface of the fixation member 21 contacting the cylinder block 3. Each of the recessed and protruding surfaces may then be engaged with the cylinder head 2 or the cylinder block 3. This enables the slip between the fixation member 21 and the cylinder head 2 or the cylinder block 3 to be suppressed, thus effectively preventing the possible local deformation of the cylinder block 3.

Furthermore, similar operations and advantages can be obtained by providing a coat material with a high friction coefficient on the surface of each fixation member 21 contacting the cylinder head 2 and on the surface of the fixation member 21 contacting the cylinder block 3.

Figure 9:
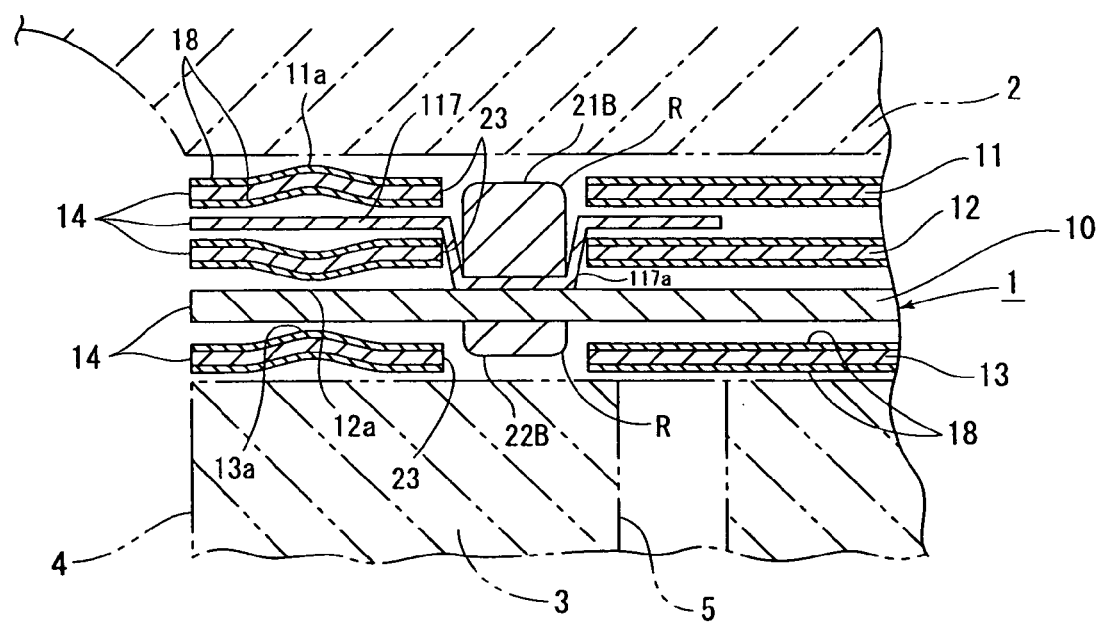
FIG. 9 is a sectional view showing a sixth embodiment of the present invention as well as a portion similar to that shown in FIG. 2.

FIG. 9 shows a modification of the fifth embodiment. According to this sixth embodiment, a circular arc portion R is formed on each corner portion of the surface of each fixation member 21 contacting the cylinder head 2 and on each corner portion of the surface of the fixation member 21 contacting the cylinder block 3. The remaining part of the configuration of the sixth embodiment is the same as that of the fifth embodiment.

When the circular arc portion R is formed on each of the fixation member 21, the circular arc portion R may be exclusively formed on each corner portion of the contact surface with the remaining part of the contact surface formed to be flat. Alternatively, the entire contact surface may be formed to be protrusively curved surface so that a central portion of the contact surface in the radial direction of the combustion chamber hole 14 projects slightly so as to continue with the circular arc portion R of the corner portion.

If the circular arc portion R is not formed on the corner portion of the contact surface, the corner portion may tightly contact the cylinder head 2 or the cylinder block 3 to form an impression on the cylinder head 2 or the cylinder block 3 along the corner portion. However, the circular arc portion R formed on the corner portion may reduce the risk of forming such an impression.

In the present embodiment, the circular arc portion R is formed on all the corner portions of each of the fixation members 21 according to the fifth embodiment. However, the formation of the circular arc portion R may be applied exclusively to the fixation members 21 contacting either one of the cylinder head 2 and the cylinder block 3 depending on the materials of the cylinder head 2 and the cylinder block 3. Furthermore, apparently, similar operations and advantages are obtained by forming the circular arc portion R on the corner portions of each of the fixation members 21 according to any embodiment other than the fifth embodiment.

REFERENCE SIGNS LIST

1 Cylinder head gasket
2 Cylinder head
3 Cylinder block
4 Cylinder bore
5 Water jacket
10 Substrate
11 to 13 Seal plate
14 Combustion chamber hole
17, 117 Shim plates
23 Engagement hole
21A, 21B, 21C, 22A, 22B, 22C Fixation members
R Circular arc portion

The invention claimed is:

1. A cylinder head gasket sandwiched between a cylinder head and a cylinder block having a cylinder bore, said cylinder head gasket comprising:
   a substrate with a combustion chamber hole drilled at the position of the cylinder bore;
   a seal plate stacked on the substrate and comprising an engagement hole formed therein; and
   an upper fixation member and a lower fixation member, which respectively protrude toward the cylinder head and the cylinder block, are respectively directly adhered to opposite surfaces of the substrate around a periphery of the combustion chamber hole and engage with the engagement hole,
   wherein when the cylinder head gasket is sandwiched between the cylinder head and the cylinder block, the upper fixation member contacts the cylinder head, the lower fixation member contacts the cylinder block and fixation members and the substrate are sandwiched between the cylinder head and the cylinder block.

2. The cylinder head gasket according to claim 1, wherein the fixation members are provided at a plurality of positions surrounding the combustion chamber hole.

3. The cylinder head gasket according to claim 1, wherein a plurality of the combustion chamber holes are formed on a straight line, and each of the fixation members is provided at a position adjacent to each of the adjacent combustion chamber holes.

4. The cylinder head gasket according to claim 1, wherein a plurality of the combustion chamber holes are formed on a straight line, and the fixation members are provided at a plurality of positions so as to surround each of the combustion chamber holes, the plurality of positions including positions outside the plurality of combustion chamber holes formed on the straight line, positions orthogonal to the straight line, and positions each adjacent to one of the adjacent combustion chamber holes.

5. The cylinder head gasket according to claim 4, wherein fixation members provided at the position adjacent to each of the adjacent combustion chamber holes are set to be thicker than the other fixation members.

6. The cylinder head gasket according to claim 4, wherein fixation members provided at the position adjacent to each of the adjacent combustion chamber holes are set to be narrower than the other fixation members.

7. The cylinder head gasket according to claim 1, wherein each of the fixation members is arranged closer to the cylinder bore than a water jacket formed so as to surround the cylinder bore and which is open in a surface of the cylinder block.

8. The cylinder head gasket according to claim 1, wherein a circular arc portion is formed on at least one of a corner portion of a surface of each of the fixation members contacting the cylinder head and a corner portion of a surface of each of the fixation members contacting the cylinder block.

9. The cylinder head gasket according to claim 1, wherein at least two seal plates are overlappingly stacked on one side of the substrate, and a shim plate is interposed between the seal plates and closer to the combustion chamber hole than the fixation members.

10. The cylinder head gasket according to claim 1, wherein at least two seal plates are overlappingly stacked on one side of the substrate, and a shim plate extending from the combustion chamber hole beyond the fixation member is interposed between the seal plates, and the shim plate partly projects through the engagement hole formed on the seal plate located closer to the substrate than the shim plate, and is sandwiched between the fixation members and the substrate and integrally secured to the fixation members and the substrate.

11. The cylinder head gasket according to claim 1, wherein a full bead is formed on the seal plate located closer to the combustion chamber hole than the fixation members.

12. A cylinder head gasket sandwiched between a cylinder head and a cylinder block having a cylinder bore, said cylinder head gasket comprising:
a substrate with a combustion chamber hole drilled at the position of the cylinder bore;
an upper surface seal plate provided on an upper surface of the substrate and comprising an upper engagement hole formed therein and a lower surface seal plate provided on a lower surface of the substrate and comprising a lower engagement hole formed therein;
an upper fixation member and a lower fixation member, which respectively protrude toward the cylinder head and the cylinder block, are respectively directly adhered to opposite surfaces of the substrate around a periphery of the combustion chamber hole and respectively engage with the upper engagement hole and the lower engagement hole;
wherein the upper surface seal plate engages with the upper fixation member, the lower surface seal plate engages with the lower fixation member and the pair of fixation members are sandwiched between the cylinder head and the cylinder block.

13. The cylinder head gasket according to claim 12, wherein the fixation members are provided at a plurality of positions surrounding the combustion chamber hole.

14. The cylinder head gasket according to claim 12, wherein a plurality of the combustion chamber holes are formed on a straight line, and each of the fixation members is provided at a position adjacent to each of the adjacent combustion chamber holes.

15. The cylinder head gasket according to claim 12, wherein a plurality of the combustion chamber holes are formed on a straight line, and the fixation members are provided at a plurality of positions so as to surround each of the combustion chamber holes, the plurality of positions including positions outside the plurality of combustion chamber holes formed on the straight line, positions orthogonal to the straight line, and positions each adjacent to one of the adjacent combustion chamber holes.

16. The cylinder head gasket according to claim 15, wherein fixation members provided at the position adjacent to each of the adjacent combustion chamber holes are set to be thicker than the other fixation members.

17. The cylinder head gasket according to claim 15, wherein fixation members provided at the position adjacent to each of the adjacent combustion chamber holes are set to be narrower than the other fixation members.

18. The cylinder head gasket according to claim 12, wherein each of the fixation members is arranged closer to the cylinder bore than a water jacket formed so as to surround the cylinder bore and which is open in a surface of the cylinder block.

19. The cylinder head gasket according to claim 12, wherein a circular arc portion is formed on at least one of a corner portion of a surface of each of the fixation members contacting the cylinder head and a corner portion of a surface of each of the fixation members contacting the cylinder block.

20. The cylinder head gasket according to claim 12, wherein at least two seal plates are overlappingly stacked on one side of the substrate, and a shim plate is interposed between the seal plates and closer to the combustion chamber hole than the fixation members.

21. The cylinder head gasket according to claim 12, wherein at least two seal plates are overlappingly stacked on one side of the substrate, and a shim plate extending from the combustion chamber hole beyond the fixation members is interposed between the seal plates, and the shim plate partly projects through the engagement hole formed on the seal plate located closer to the substrate than the shim plate, and is sandwiched between the fixation members and the substrate and integrally secured to the fixation members and the substrate.

22. The cylinder head gasket according to claim 12, wherein a full bead is formed on the seal plate located closer to the combustion chamber hole than the fixation members.

* * * * *